United States Patent Office 2,784,185
Patented Mar. 5, 1957

2,784,185
PHENOTHIAZINE COMPOUNDS

Wilhelm Alfons Schuler, Hamburg, Germany, assignor to Chemische Fabrik Promonta G. m. b. H., Hamburg, Germany No Drawing. Application March 24, 1954, Serial No. 418,477

Claims priority, application Germany March 27, 1953

3 Claims. (Cl. 260—243)

The invention relates to derivatives of phenothiazines.

It is a principal object of the invention to provide a method of preparing compounds of phenothiazines with heterocyclic amines or derivatives thereof containing nitrogen in the nucleus. Such compounds have the general formula (1)

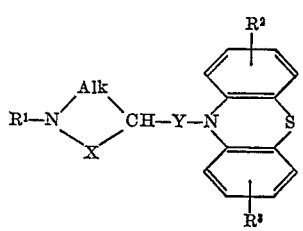

wherein $R^1$ is benzly or alkyl having not more than 4C atoms, $R^2$ and $R^3$ are monovalent substituents such as $CH_3$, $CH_3O$, halogen, hydrogen. Alk is a straight or branched alkylene group containing as a straight chain at most 3C atoms, and X and Y represent either direct linkages or branched or straight chain alkylene groups having at most 3C atoms.

Other objects and advantages will become apparent from a consideration of the specification and claims.

The recited compounds generally slow down the vital functions, for instance lower the blood pressure and the pulse and breathing frequencies, and have a potentiating effect on narcotics; they are therefore valuable assistants in complicated surgical operations and are in certain cases instrumental in making such operations possible and in reducing the risks involved.

Compounds of phenothiazines with aliphatic amines, for instance dialkylaminoethyl phenothiazine compounds are readily obtained in yields up to 65 percent by reacting the chloride of the amine with phenothiazine in the presence of sodium amide. However, all attempts to prepare corresponding compounds from heterocyclic amines, for instance from 1-methyl-4-chloropiperidine, had no success or gave so small yields, about 2 percent, as to prevent a commercial manufacture of such compounds.

I have found that compounds of Formula 1 are readily obtained in good yields by reacting, in the presence of basic condensating agents, phenothiazines having a free NH group with heterocyclic bromides or iodides of the formula (2)

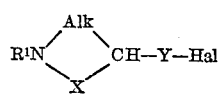

wherein $R^1$, Alk, X and Y define the same constituents as in Formula 1 and Hal is bromine or iodine. Suitable condensation agents are, for instance, sodium, sodium amide, potassium amide, sodium alcoholate, sodium hydride, and the like.

The phenothiazine derivatives obtained in this way are preferably converted to salts of inorganic or organic acids.

The invention is illustrated by the following examples:

EXAMPLE 1

Preparation of 10-[(1-methyl-3-piperidyl)-methyl] phenothiazine

A 500 cc. flask equipped with a mechanical stirrer, reflux condenser and a soda-lime tube was filled with 230 cc. of absolute xylene, 27.5 g. of 1-methyl-3-bromomethylpiperidine, 53.3 g. of phenothiazine and 14.2 g. of finely powdered sodium amide, and the solution was heated under reflux for 6 hours. After cooling water was added and the batch was extracted with ether. As the hydrochloric acid salt of the obtained phenothiazine derivative is difficulty soluble in water, the further processing was carried out by way of the acetate. The etheric solution was extracted several times in a separating funnel with dilute acetic acid. The combined aqueous extracts were basified, extracted with either, dried with potassium carbonate and, after removal of the ether, distilled in vacuo.

Yield=64%; boiling point 230–235° C./4 mm.; M. P. of the hydrochloride 180–181° C.

The reaction proceeded according to the following equation

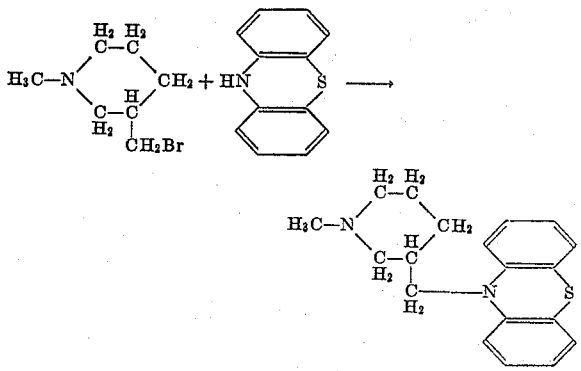

EXAMPLE 2

Preparation of 10-(1-ethyl-3-piperidyl) phenothiazine

The preparation was carried out in the same way as in Example 1, using 1-ethyl-3-bromopiperidine as starting material. Boiling point 220–225° C./2–3 mm.; M. P. of hydrochloride 230–231° C.

In a corresponding manner, the following compounds were prepared:

10-(1-butyl - 3 - piperidyl)phenothiazine. Boiling point 235–240° C./2–3 mm.; the hydrochloric salt is hygroscopic.

10-(1-methyl - 4 - piperidyl)phenothiazine. Boiling point 196° C./2–3 mm.; M. P. of hydrochloride 244–246° C.

10-(1-methyl-4-piperidyl)chlorophenothiazine. Boiling point 198–200° C./2–3 mm.; the hydrochloride is hygroscopic.

Also prepared in this way were:

10-(1-propyl-3-piperidyl)methylphenothiazine;
10-(1-methyl-3-piperidyl)methoxyphenothiazine;
10-(1-butyl-2-piperidyl)-methylphenothiazine;
and others.

EXAMPLE 3

Preparation of 10-(1-methyl-3-pyrrolidyl)phenothiazine

Methylpyrrolidylbromide was prepared by first reacting 1 mole of acrylic ester with 1 mole of methylamine. The obtained methylaminoester was then reacted with bromoacetic ester. The thus obtained methylamino diester was subjected to a Claisen condensation, and the obtained beta-ketoester was saponified and boiled. The formed N-methylpyrrolidine was hydrogenated with hydrogen over Ramsey nickel to N-methylpyrrolidol (B. P. 175–178° C.), and this was converted with hydrogen bromide to the corresponding bromide.

The obtained 1-methyl-3-bromopyrrolidine was then reacted with phenothiazine in the manner described in Example 1. The boiling point of the 10-(1-methyl-3-pyrrolidyl)phenothiazine was 192–193° C./4 mm.

In a similar manner, 10-(1-methyl-2-pyrrolidyl)phenothiazine and other pyrrolidyl phenothiazines were prepared.

I claim:

1. A compound selected from the group consisting of compounds of the formula

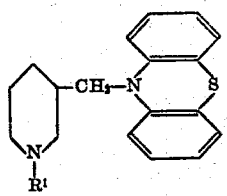

wherein $R^1$ is an alkyl group having not more than 4 carbon atoms, and hydrochloric acid addition salts thereof.

2. 10-[(1-methyl-3-piperidyl)-methyl]-phenothiazine.

3. The hydrochloride of the compound of claim 2.

References Cited in the file of this patent

UNITED STATES PATENTS

| | | |
|---|---|---|
| 2,483,998 | Hunter et al. | Oct. 4, 1949 |
| 2,483,999 | Hunter et al. | Oct. 4, 1949 |
| 2,519,886 | Charpentier | Aug. 22, 1950 |
| 2,526,118 | Charpentier | Oct. 17, 1950 |
| 2,590,125 | Robinson et al. | Mar. 25, 1952 |